(12) United States Patent
Nakamura et al.

(10) Patent No.: US 6,265,470 B1
(45) Date of Patent: Jul. 24, 2001

(54) CURABLE COMPOSITION FOR COATING, AND ARTICLES COATED WITH IT

(75) Inventors: Seigo Nakamura; Masaharu Inoue; Toshirou Nanbu, all of Hyogo (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/269,962

(22) PCT Filed: Oct. 30, 1997

(86) PCT No.: PCT/JP97/03955

§ 371 Date: Apr. 8, 1999

§ 102(e) Date: Apr. 8, 1999

(87) PCT Pub. No.: WO98/30644

PCT Pub. Date: Jul. 16, 1998

(30) Foreign Application Priority Data

Jan. 14, 1997 (JP) .................................................... 9-004382

(51) Int. Cl.⁷ ................................ C08K 5/10; C08L 63/02
(52) U.S. Cl. ......................... 523/456; 525/118; 525/533
(58) Field of Search ............................ 523/456; 525/533, 525/118

(56) References Cited

U.S. PATENT DOCUMENTS 3,446,764   5/1969   Phillips et al. .
4,287,113   9/1981   Takashina et al. .

FOREIGN PATENT DOCUMENTS

667371  *  8/1995  (EP) .
768326  *  4/1997  (EP) .

* cited by examiner

Primary Examiner—Robert Dawson
Assistant Examiner—D. Aylward
(74) Attorney, Agent, or Firm—Jordan and Hamburg LLP

(57) ABSTRACT

The curable composition for coating of the invention comprises (A) 100 parts by weight of a resin having at least 2 epoxy groups in one molecule and having an epoxy equivalent of from 200 to 2,000 g/mol, and (B) from 0.001 to 100 parts by weight of a compound having at least 2 carboxyl groups in one molecule, in a molar ratio of the epoxy group to the carboxyl group (epoxy group/carboxyl group) of from 0.2/1 to 5.0/1, and contains (C) at least one organic solvent selected from glycol monoalkyl ethers, vinyl ethers and cyclic ethers, and at least one selected from monoalkyl alcohol compounds and compounds capable of giving alcohols through hydrolysis, each in an amount of from 1.0 to 50 parts by weight relative to 100 parts by weight of the total solid resin content of the composition. The composition has good storage stability and good thermal curability, and the coating films from it have good acid resistance, scratch resistance and weather resistance.

8 Claims, No Drawings

CURABLE COMPOSITION FOR COATING, AND ARTICLES COATED WITH IT

TECHNICAL FIELD

The present invention relates to a curable composition for top coating, and to articles coated with it. Precisely, it relates to a curable composition for top coating favorable for cars, industrial machines, steel furniture, interior and exterior decorations for constructions, household electric appliances, plastic goods, etc., and to articles coated with the composition. More precisely, the invention relates to a curable composition for top coating, which forms coating films having high acid resistance and scratch resistance, good outward appearance, high waterproofness and weather resistance, and high hardness, and which has good storage stability, and to articles coated with it. The composition is especially favorable for top coating cars.

BACKGROUND ART

For coating cars, industrial machines, steel furniture, interior and exterior decorations for constructions, household electric appliances, plastics and others, coating compositions consisting essentially of melamine resins such as alkydmelamines, acrylic melamines and the like have heretofore been used.

However, the conventional coating compositions consisting essentially of such melamine resins are problematic in that they generate a large amount of harmful formalin when cured, and that the cured films have poor acid resistance and are therefore often corroded by acid rain. In particular, the problem with acid rain caused by recent air pollution has become more serious, and the conventional coating films are often etched, whitened or stained by acid rain.

In order to solve this problem, a coating composition has been proposed in Japanese Patent Application Laid-Open (JP-A) Hei-2-45577 and Hei-3-28650, in which are formed ester bonds that act as crosslinking points, through reaction of an acid with an epoxy group.

The coating film of the proposed composition has good acid resistance, but is still defective in that it is whitened in an accelerated weather resistance test. In addition, the low-temperature curability of the composition is poor, the coating film of the composition formed around car bodies is often scratched with brushes when the car bodies are washed with a car washer, and the storage stability of the composition is poor.

For finishing car bodies by top coating, generally employed is any of two types of metallic color finishing and solid color finishing.

For the metallic color finishing of those two, generally employed is a 2-coat 1-bake method of heating and curing coating composition, which comprises coating a substrate with a metallic base coat followed by overcoating it with a clear coat of an acrylic melamine resin composition in an wet-on-wet system.

For the other solid color finishing, generally employed is a 1-coat 1-bake method of using an alkydmelamine resin composition, in which the composition is heated and cured to form top coating. For recent severe requirements for the properties of coating films, including, for example, finish appearance, weather resistance, acid resistance, scratch resistance and stain resistance thereof, a method of overcoating a solid color-finished substrate with a clear coat of an acrylic melamine resin composition or the like has been proposed. However, even in the proposed method of overcoating the solid color finish with such a clear coat, coated articles having the properties of good acid resistance, good scratch resistance and good weather resistance could not as yet be obtained.

The present invention has been made in consideration of the current situation noted above, and its object is to provide a curable composition for top coating, which has good thermal curability to form good coating films having good acid resistance, weather resistance, waterproofness, scratch resistance and outward appearance, and which additionally has good storage stability. In particular, the composition forms excellent clear coats when used in forming car bodies. The invention further provides articles as coated with the composition.

DISCLOSURE OF THE INVENTION

The curable composition for top coating of the invention comprises (A) 100 parts by weight of a resin having at least 2 epoxy groups in one molecule and having an epoxy equivalent of from 200 to 2,000 g/mol, and (B) from 0.001 to 100 parts by weight of a compound having at least 2 carboxyl groups in one molecule, in a molar ratio of the epoxy group to the carboxyl group of from 0.2/1 to 5.0/1, and contains (C) at least one organic solvent selected from glycol monoalkyl ethers, vinyl ethers and cyclic ethers, and at least one selected from monoalkyl alcohol compounds and compounds capable of giving alcohols through hydrolysis, each in an amount of from 1.0 to 30 parts by weight relative to 100 parts by weight of the total solid resin content of the composition.

In the curable composition for coating noted above, the resin of the component (A) may have alcoholic hydroxyl groups in a ratio of not smaller than 400 g/mol in terms of the hydroxyl equivalent, and have hydrolyzable silyl groups in a ratio of not smaller than 500 g/mol in terms of the hydrolyzable silyl equivalent; and the component (B) may be an oligomer compound as obtained through half-esterification of a polyol compound with an acid anhydride to have at least 2 carboxyl groups in one molecule and have a molecular weight of not larger than 2,000.

The curable composition for coating of the invention may contain (D) a curing catalyst in an amount of from 0.001 to 10 parts by weight relative to 100 parts by weight of the total solid content of the components (A) and (B).

The curable composition for coating of the invention may contain (E) a hydroxyl group-having resin in an amount of from 0 to 80 parts by weight relative to 100 parts by weight of the total solid content of the components (A) and (B).

The hydroxyl group-having resin of the component (E) may be composed of from 5 to 30 parts by weight of at least one, hydroxyl group-having vinylic monomer and from 70 to 95 parts by weight of at least one vinylic monomer having no hydroxyl group. The resin may be a non-aqueous dispersed polymer to be prepared through dispersion polymerization of at least one, hydroxyl group-having vinylic monomer and at least one vinylic monomer having no hydroxyl group in an organic solution that contains an organic solvent-soluble polymer having a number-average molecular weight of from 1,000 to 25,000, and the non-aqueous dispersed polymer thus prepared is insoluble in the organic solution.

The curable composition of the invention may further contain (F) an amino resin in an amount of not larger than 30 parts by weight relative to 100 parts by weight of the total solid content of the components (A) and (B).

The coated article of the invention has a clear top coat as formed over the surface of the substrate previously coated with a coating composition that contains metallic powder and/or color pigment, in which the clear top coat consists essentially of the composition of the invention noted above.

The terminology "vinylic" as referred to herein is meant to indicate the group derived from a compound having polymerizable C=C bonding, such as vinyl group, vinylidene group, etc.

BEST MODES OF CARRYING OUT THE INVENTION

The constituent components (A) to (F) and others that may constitute the curable composition for top coating of the invention are described below in order.

Component (A)

The component (A) of the basic, epoxy group-having resin for use in the invention includes, for example, the following four types of resins [1], [2], [3], [4]:

[1] Epoxy group-having resin (hereinafter referred to as "resin [1]").
[2] Resin having both epoxy and hydroxyl groups (hereinafter referred to as "resin [2]").
[3] Resin having both epoxy and hydrolyzable silyl groups (hereinafter referred to as "resin [3]").
[4] Resin having all epoxy, hydrolyzable silyl and hydroxyl groups (hereinafter referred to as "resin [4]").

These resins [1] to [4] are described below.

[Resin [1] (epoxy group-having resin)]

Resin [1] is composed of units from epoxy group-having vinylic monomers, and units from other copolymerizable vinylic monomers, etc.

The copolymerizable, epoxy group-having vinylic monomers are not specifically defined, and include, for example, those of the following general formulae (1) to (14):

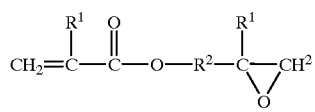
(1)

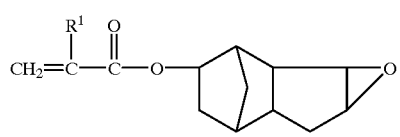
(2)

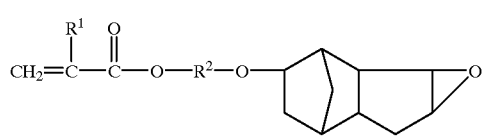
(3)

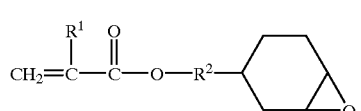
(4)

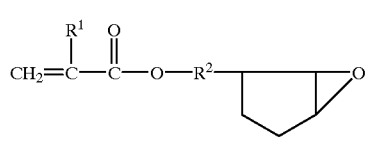
(5)

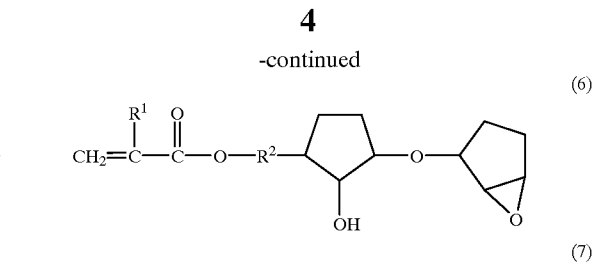
(6)

(7)

(8)

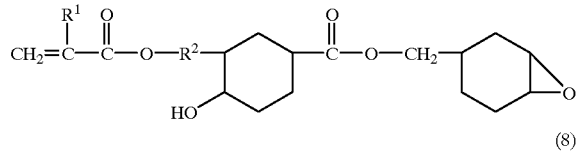
(9)

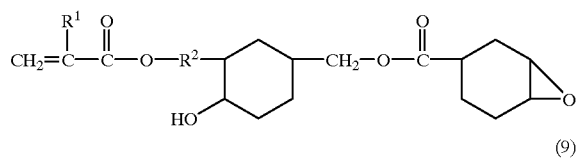

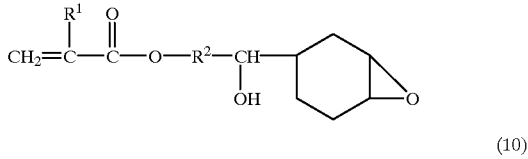
(10)

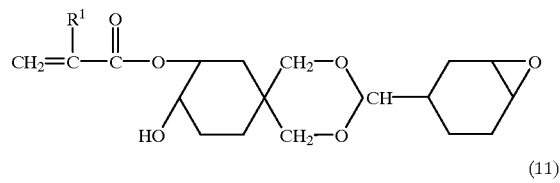
(11)

(12)

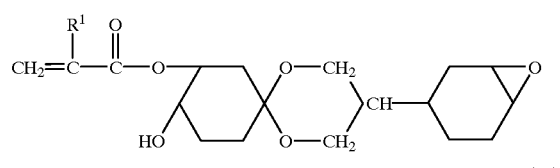
(13)

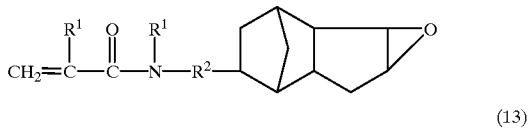
(14)

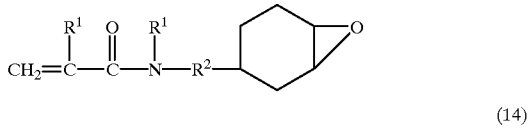

In those general formulae, $R^1$ represents a hydrogen atom or a methyl group, and $R^2$ represents a divalent aliphatic saturated hydrocarbon group having from 1 to 6 carbon atoms.

The amount of the epoxy group-having vinylic monomers to be in resin [1] is preferably from 10 to 70%, more preferably from 20 to 60% of the total amount of the comonomers therein. If the amount of those monomers is smaller than 10%, the composition to be obtained herein could not have good curability and acid resistance. However, if the amount is larger than 70%, the compatibility of resin [1] with other resins will be poor, and the weather resistance of the cured product of the composition will be poor.

The other copolymerizable vinylic monomers are not also specifically defined, and include, for example, methyl (meth)acrylate, ethyl (meth)acrylate, butyl (meth)acrylate, isobutyl (meth)acrylate, tert-butyl (meth)acrylate, cyclohexyl (meth)acrylate, 3,3,5-trimethylcyclohexyl (meth)acrylate, 2-ethylhexyl (meth)acrylate, isobornyl (meth) acrylate, stearyl (meth)acrylate, benzyl (meth)acrylate, cyclohexyl (meth)acrylate, trifluoroethyl (meth)acrylate, pentafluoropropyl (meth)acrylate, as well as unsaturated polycarboxylates such as diesters or half-esters of unsaturated polycarboxylic acids (maleic acid, fumaric acid, itaconic acid, etc.) with linear or branched alcohols having from 1 to 20 carbon atoms; aromatic hydrocarbon-based vinyl compounds such as styrene, α-methylstyrene, chlorostyrene, sodium styrenesulfonate, etc.; vinyl esters and allyl compounds such as vinyl acetate, vinyl propionate, diallyl phthalate, etc.; nitrile group-having vinyl compounds such as (meth)acrylonitrile, etc.; silane compounds such as γ-(meth)acryloxypropyltrimethoxysilane, γ-(meth) acryloxypropyltriethoxysilane, γ-(meth) acryloxypropyltrisilanol, γ-(meth) acryloxypropylmethyldimethoxysilane, vinyltrimethoxysilane, vinyltriethoxysilane, 2-styrylethyltrimethoxysilane, allyltriethoxysilane, etc.; basic nitrogen atom-containing vinyl compounds such as dimethylaminoethyl (meth)acrylate, dimethylaminoethyl (meth)acrylate, diethylaminoethyl (meth)acrylate, vinylpyridine, aminoethyl vinyl ether, etc.; amido group-having vinyl compounds such as (meth)acrylamide, itaconic acid diamide, α-ethyl(meth)acrylamide, crotonamide, maleic acid diamide, fumaric acid diamide, N-vinylpyrrolidone, N-butoxymethyl(meth)acrylamide, N,N-dimethylacrylamide, N-methylacrylamide, acryloylmorpholine, etc.; other vinyl compounds such as vinyl methyl ether, vinyl chloride, vinylidene chloride, chloroprene, propylene, butadiene, isoprene, maleimide, N-vinylimidazole, etc.

For producing resin [1], preferred is a solution polymerization method using a peroxide-type radical initiator such as t-butyl peroxyacetate or the like, or using an azo-type radical initiator such as azobisisobutyronitrile or the like, since resin [1] is produced easily in the method.

If desired, in the method, a chain transfer agent may be used for controlling the molecular weight of the polymers produced. The chain transfer agent includes, for example, n-dodecylmercaptan, t-dodecylmercaptan, n-butylmercaptan, γ-mercaptopropyltrimethoxysilane, γ-mercaptopropyltriethoxysilane, γ-mercaptopropylmethyldimethoxysilane, γ-mercaptopropylmethyldiethoxysilane, etc.

The polymerization solvent to be used in the solution polymerization is not specifically defined, so far as it is inactive to the polymerization. For example, employable are inactive solvents such as hydrocarbons (toluene, xylene, n-hexane, cyclohexane, etc.), acetates (ethyl acetate, butyl acetate, etc.), alcohols (methanol, ethanol, isopropanol, n-butyl alcohol, etc.), ethers (ethyl cellosolve, butyl cellosolve, cellosolve acetate, etc.), ketones (methyl ethyl ketone, ethyl acetacetate, acetylacetone, diacetonealcohol, methyl isobutyl ketone, acetone, etc.).

The number-average molecular weight of resin [1] is preferably from 2,000 to 20,000, more preferably from 2,500 to 15,000, in view of the expected physical properties, such as durability and others, of the cured films to be formed from the curable composition of the invention.

The epoxy equivalent of resin [1] is preferably from 200 to 2,000 g/mol, more preferably from 250 to 1,000 g/mol, even more preferably from 300 to 750 g/mol, in view of the curability of the composition and of the weather resistance as well as the final appearance of the cured films of the composition.

[Resin [2] (resin having both epoxy and hydroxyl groups)]

The epoxy equivalent of resin [2] is preferably from 200 to 2,000 g/mol, more preferably from 250 to 1,000 g/mol, even more preferably from 300 to 750 g/mol. If the epoxy equivalent is smaller than 200 g/mol, the coating film from the composition will be too hard, and its weather resistance is therefore poor. If, however, the epoxy equivalent is larger than 2,000 g/mol, the thermal curability of the composition will be poor and, in addition, the final appearance and the impact resistance of the coating films from the composition will also be poor.

The hydroxyl equivalent of resin [2] is preferably not smaller than 400 g/mol, more preferably not smaller than 450 g/mol, even more preferably from 500 to 3,000 g/mol. If the hydroxyl equivalent is smaller than 400 g/mol, the waterproofness and the acid resistance of the coating films from the composition will be poor.

The number-average molecular weight of resin [2] is preferably from 2,000 to 20,000, more preferably from 2,500 to 10,000. If the number-average molecular weight is smaller than 2,000, the mechanical properties and also the waterproofness of the coating films from the composition will be poor. However, if it is larger than 20,000, the viscosity of the composition will be too high, resulting in that the solid concentration of the composition must be lowered prior to using the composition for coating.

Resin [2] comprises, for example, units from hydroxyl group-having monomers, units from epoxy group-having vinylic monomers such as those noted above, and units from other copolymerizable vinylic monomers, etc.; and it may be produced in solution polymerization using a radical initiator.

The hydroxyl group-having monomers are not specifically defined, including, for example, 2-hydroxyethyl (meth) acrylate, 2-hydroxypropyl (meth)acrylate, 2-hydroxybutyl (meth)acrylate, 4-hydroxybutyl (meth)acrylate, 2-hydroxyethyl vinyl ether, N-methylol(meth)acrylamide, 4-hydroxystyrene-vinyltoluene, Toa Synthetic Chemical's Aronics 5700, 4-hydroxystyrene, Nippon Shokubai Kagaku's HE-10, HE-20, HP-1 and HP-20 (these are all hydroxyl-terminated acrylate oligomers), Nippon Oils & Fats' Blemmer PP series (polypropylene glycol methacrylates), Blemmer PE series (polyethylene glycol monomethacrylates), Blemmer PEP series (polyethylene glycol polypropylene glycol methacrylates), Blemmer AP-400 (polypropylene glycol monoacrylate), Blemmer AE-350 (polyethylene glycol monoacrylate), Blemmer NKH-5050 (polypropylene glycol polytrimethylene monoacrylate), and Blemmer GLM (glycerol monomethacrylate), as well as ε-caprolactone-modified, copolymerizable hydroxyalkylvinylic compounds as obtained through reaction of hydroxyl group-having vinylic compounds and ε-caprolactone.

These hydroxyl group-having vinylic monomers may be used either singly or as combined.

The amount of the hydroxyl group-having vinylic monomers to be used in producing resin [2] is preferably from 5 to 50%, more preferably from 7 to 40% of the total amount of the comonomers for resin [2]. If the amount of the monomers used is smaller than 5%, the resulting composition could not have good curability. However, if it is larger than 50%, the waterproofness and the acid resistance of the coating films from the composition will be poor.

[Resin [3] (resin having both epoxy and hydrolyzable silyl groups]

Resin [3] is a vinylic copolymer, of which the main chain is substantially a vinylic copolymer chain. The vinylic copolymer of resin [3] has, in one molecule, at least one hydrolyzable silyl group of the following general formula (I) at the terminals of the main chain and/or in the side chains, and at least one epoxy group at the terminals of the main chain and/or in the side chains, in which the silyl group is bonded to the carbon atom in the molecule and its conception includes silanol groups.

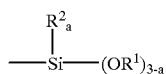
(I)

wherein $R^1$ represents a hydrogen atom, or an alkyl group having from 1 to 10 carbon atoms; $R^2$ represents a hydrogen atom, or a monovalent hydrocarbon group selected from an alkyl group having from 1 to 10 carbon atoms, an aryl group and an aralkyl group; and a represents an integer of from 0 to 2.

Since resin [3] is such a vinylic copolymer, of which the main chain is substantially a vinylic copolymer chain, the coating films from the curable composition comprising resin [3] have good weather resistance and chemical resistance. In addition, since resin [3] contains at least one hydrolyzable silyl group as bonded to the carbon atom therein, the coating films from the composition comprising it have good waterproofness, alkali resistance and acid resistance.

The component (A) shall have at least one hydrolyzable silyl group of formula (I) in one molecule, but preferably from 2 to 10 such hydrolyzable silyl groups, in view of the scratch resistance and the solvent resistance of the coating films from the composition.

In formula (I), $R^1$ represents a hydrogen atom or an alkyl group having from 1 to 10 carbon atoms, but is preferably an alkyl group having from 1 to 4 carbon atoms, such as methyl, ethyl, n-propyl, i-propyl, n-butyl, i-butyl or t-butyl group. If the number of carbon atoms constituting the alkyl group is larger than 10, the reactivity of the hydrolyzable silyl group will be low. If $R^1$ is any other group except alkyl groups, for example, if it is a phenyl group, a benzyl group or the like, such other groups are unfavorable since the reactivity of the hydrolyzable silyl group is also low.

In formula (I), $R^2$ may be a hydrogen atom, or an alkyl group having from 1 to 10 carbon atoms, but is preferably a monovalent hydrocarbon group selected from an alkyl group having from 1 to 4 carbon atoms, of which the specific examples are the same as those mentioned hereinabove for $R^1$, an aryl group having from 6 to 25 carbon atoms, such as a phenyl group, etc., and an aralkyl group having from 7 to 12 carbon atoms such as a benzyl group, etc. Of those, preferred is an alkyl group, since the curability of the composition to be obtained herein is good.

The epoxy equivalent of resin [3] is from 200 to 2,000 g/mol, preferably from 250 to 1,000 g/mol, more preferably from 300 to 750 g/mol. If the epoxy equivalent is smaller than 200 g/mol, the coating films from the composition will be too hard and therefore have poor weather resistance. On the other hand, if the epoxy equivalent is larger than 3,000 g/mol, the thermal curability of the composition is poor, and, in addition, the scratch resistance and the final appearance of the coating films from the composition will be poor.

The hydrolyzable silyl equivalent of the vinylic copolymer (resin [3]) is preferably not smaller than 500 g/liter, more preferably not smaller than 600 g/liter, even more preferably not smaller than 700 g/liter, from the viewpoint that the curable composition comprising the copolymer has good thermal curability and that the coating films from the composition have good acid resistance and good scratch resistance. If, however, the hydrolyzable silyl equivalent of the copolymer is smaller than 500 g/liter, the inner stress of the coating films from the composition will be large, and therefore the weather resistance thereof will be poor.

The resin [3] may comprise, for example, units from hydrolyzable silyl group-having vinylic monomers, units from epoxy group-having vinylic monomers such as those mentioned above, and units from other copolymerizable vinylic monomers such as those mentioned above, etc., and it may be produced by solution polymerization using a radical initiator.

The hydrolyzable silyl group-having vinylic monomers include, for example, the following:

Compounds of a general formula (III):

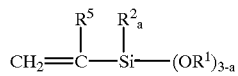
(III)

wherein $R^1$, $R^2$ and a have the same meanings as above; and $R^5$ represents a hydrogen atom or a methyl group, for example, the following:

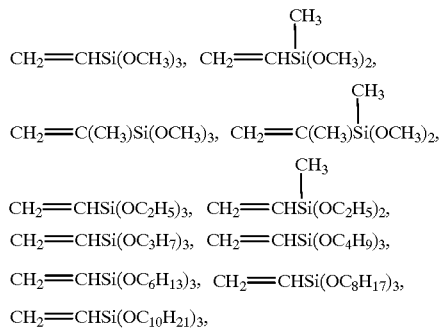

Compounds of a general formula (IV):

(IV)

for example, the following:

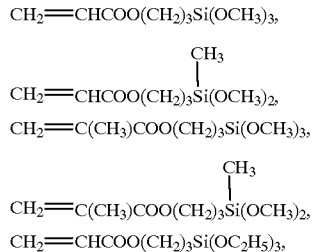

-continued

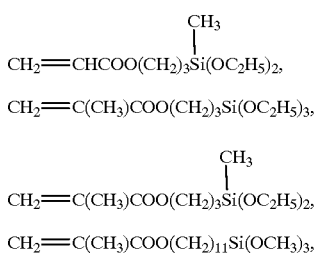

Compounds of a general formula (V):

for example, the following:

$CH_2=CH-CH_2OCO(o-C_6H_4)COO(CH_2)_3Si(OCH_3)_3$.

$CH_2=CH-CH_2OCO(o-C_6H_4)COO(CH_2)_3Si(CH_3)(OCH_3)_2$.

Compounds of a general formula (VII):

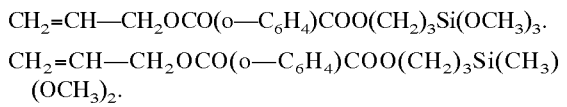

wherein $R^1$, $R^2$, $R^5$ and a have the same meanings as above; and p represents an integer of from 0 to 22, for example, the following:

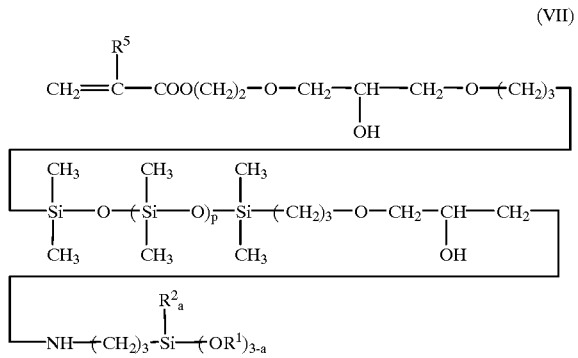

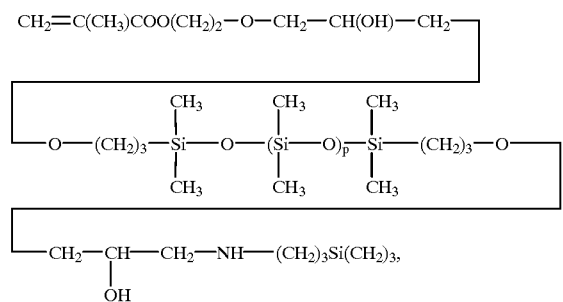

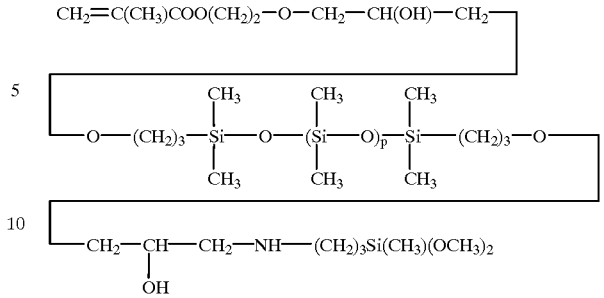

They further include (meth)acrylates having the hydrolyzable silyl group of formula (III) as bonded to the terminal via urethane bonding or siloxane bonding. These monomers may be used either singly or as combined. Of those, preferred are compounds of formula (V), as they are easy to handle and are inexpensive and they do not give any side products in polymerization.

The amount of the hydrolyzable silyl group-having vinylic monomers to be used in producing resin [3] is preferably from 5 to 60% (by weight—the same shall apply hereunder), more preferably from 10 to 50% of the total amount of the comonomers for resin [3]. If the amount of the hydrolyzable silyl group-having monomers used is smaller than 5%, the coating films from the curable composition obtained will have poor acid resistance. However, if the amount is larger than 60%, the storage stability of the curable composition will be poor.

The number-average molecular weight of resin [3] is preferably from 2,000 to 20,000, more preferably from 2,500 to 15,000, in view of the expected physical properties, such as durability and others, of the cured films to be formed from the curable composition.

[Resin [4] (resin having all epoxy, hydrolyzable silyl and hydroxyl groups)]

Resin [4] comprises, for example, units from epoxy group-having vinylic monomers such as those mentioned above, units from hydroxyl group-having vinylic monomers such as those mentioned above, units from hydrolyzable silyl group-having vinylic monomers such as those mentioned above, and units from any other copolymerizable vinylic monomers such as those mentioned above, etc., and it may be produced in solution polymerization using a radical initiator.

In resin [4], the molar ratio of alcoholic hydroxyl groups to hydrolyzable silyl groups (alcoholic hydroxyl groups/ hydrolyzable silyl groups) preferably falls between 0.0 and 10, more preferably between 0.1 and 7.5, even more preferably between 0.2 and 4.0, from the viewpoint that the curable composition to be obtained has good thermal curability and that the coating films from the composition have good acid resistance, good weather resistance and good waterproofness.

In order to make resin [4] have the molar ratio falling within the defined range, for example, the amount of the hydrolyzable silyl group-having vinylic monomers and that of the alcoholic hydroxyl group-having vinylic monomers to be used in producing resin [4] may be suitably controlled.

The number-average molecular weight of resin [4] is preferably from 2,000 to 20,000, more preferably from 2,500 to 10,000. If the molecular weight is smaller than 2,000, the mechanical properties and also the waterproofness of the coating films from the composition obtained will be poor. However, if it is larger than 20,000, the viscosity of the composition will be too high, resulting in that the solid concentration of the composition must be lowered prior to using the composition for coating.

Resin [3] and resin [4] are preferred to resin [1] and resin [2], since the curable composition comprising the former has better thermal curability and since the coating films from the composition comprising the former have better scratch resistance and better weather resistance.

Component (B)

The component (B) for use in the invention is a compound having at least 2 carboxyl groups, which includes, for example, carboxyl group-having oligomer compounds to be prepared through half-esterification of polyol compounds and acid anhydrides, as well as carboxyl group-having vinylic copolymers.

The compounds for the component (B) may be used either singly or as combined.

The carboxyl group-having oligomer compound is prepared through half-esterification of a polyol compound and an acid anhydride, and has at least 2 carboxyl groups in one molecule. In view of the weather resistance, the acid resistance and the recoating adhesiveness of the coating films from the composition of the invention, the oligomer compound is preferably one having at least 2 carboxyl groups in one molecule (hereinafter referred to as "carboxylic acid oligomer"), which is prepared through half-esterification of a polyol compound having at least 2, but preferably from 2 to 10 hydroxyl groups in one molecule, with an acid anhydride.

The polyols having at least 2 hydroxyl groups in one molecule, which are for producing the carboxylic acid oligomers for use in the invention, include, for example, polyalcohols such as ethylene glycol, 1,2- and 1,3-propylene glycols, 1,3-butane-diol, 1,4-butane-diol, 2,3-butane-diol, 1,6-hexane-diol, diethylene glycol, pentane-diol, dimethylbutane-diol, hydrogenated bisphenol A, glycerin, sorbitol, neopentyl glycol, 1,3-octane-diol, 1,4-cyclohexane-dimethanol, 2-methyl-1,3-propane-diol, 1,2,6-hexane-triol, 1,2,4-butane-triol, trimethylolethane, trimethylolpropane, pentaerythritol, quinitol, mannitol, trishydroxyethyl isocyanurate, dipentaerythritol, trishydroxymethylethane, etc.; ring-cleaved adducts of lactone compounds, such as γ-butyrolactone, ε-caprolactone or the like, to those polyalcohols; alcohol-rich adducts of isocyanate compounds, such as tolylene diisocyanate, diphenylmethane diisocyanate, hexamethylene diisocyanate, isophorone diisocyanate or the like, to those polyalcohols; alcohol-rich adducts of vinyl ether compounds, such as ethylene glycol divinyl ether, polyethylene glycol divinyl ether, butane-diol divinyl ether, pentane-diol divinyl ether, hexane-diol divinyl ether, 1,4-cyclohexane-dimethanol divinyl ether, to those polyalcohols; alcohol-rich condensates of those polyalcohols with alkoxysilicone compounds, such as KR-213, KR-217, KR-9218 (all trade names of products of Shin-etsu Chemical Industry), etc.

As preferred acid anhydrides to be reacted with those polyols, for example, mentioned are hexahydrophthalic anhydride, phthalic anhydride, methylhexahydrophthalic anhydride, tetrahydrophthalic anhydride, trimellitic anhydride, etc.

Suitably controlling the ratio of the polyol to the acid anhydride to be reacted therewith will give hydroxyl group-containing carboxylic acid oligomers.

The molecular weight of the carboxyl group-having oligomer compounds is preferably not larger than 2,000, more preferably from 100 to 1,800.

The carboxyl group-having vinylic copolymers may be prepared, for example, in solution polymerization of carboxyl group-having, vinylic polymerizable compounds and any other polymerizable vinylic monomers such as those mentioned above, in the presence of a radical initiator. Alternatively, they may also be prepared through radical polymerization of acid anhydride group-having, radical-polymerizable monomers and any other copolymerizable vinylic monomers such as those mentioned above to give copolymers, followed by half-esterification of the resulting copolymers at the acid anhydride groups therein.

The carboxyl group-having, vinylic polymerizable compounds include, for example, α,β-ethylenic unsaturated carboxylic acids such as acrylic acid, methacrylic acid, itaconic acid, maleic acid, etc.; as well as half esters of anhydrides of such acids with linear or branched alcohols having from 1 to 20 carbon atoms. The acid anhydride group-having, radical-polymerizable monomers include, for example, itaconic anhydride, maleic anhydride, citraconic anhydride, etc.

The amount of the carboxyl group-having, vinylic polymerizable compounds and the acid anhydride group-having, radical-polymerizable monomers to be used for producing the polymers is preferably from 10 to 50% by weight, more preferably from 15 to 40% by weight of all monomers used.

The half-esterifying agent for the half-esterification may be an alcohol having a low molecular weight, including, for example, methanol, ethanol, n-propanol, iso-propanol, n-butanol, iso-butanol, t-butanol, methyl cellosolve, ethyl cellosolve, dimethylaminoethanol, acetol, allyl alcohol, propargyl alcohol, etc. Especially preferred are acetol, allyl alcohol, propargyl alcohol, ethanol, and methanol.

The half-esterification may be effected in any ordinary manner, at a temperature falling between room temperature and 120° C. and in the presence of a catalyst. The catalyst includes, for example, tertiary amines (e.g., triethylamine, tributylamine, etc.), and quaternary ammonium salts (e.g., benzyltrimethylammonium chloride, benzyltrimethylammonium bromide, benzyltributylammonium chloride, benzyltributylammonium bromide, etc.).

The carboxyl group-having compound for the component (B) as prepared in the manner noted above preferably has a number average molecular weight of from 1,000 to 20,000, more preferably from 2,000 to 10,000. If the molecular weight is smaller than 1,000, the mechanical properties of the coating films from the composition obtained will be poor. However, if it is larger than 20,000, the viscosity of the composition will be too high, resulting in that the solid concentration of the composition must be lowered prior to using the composition for coating.

The compound must have at least 2 carboxyl groups in one molecule. If the number of the carboxyl groups in the compound is smaller than 2, the composition could not have good curability.

The amount of the component (B) to be in the composition is from 0.001 to 100 parts by weight, relative to 100 parts by weight of the component (A). If the amount of the component (B) is larger than 100 parts by weight, there may occur a problem that the waterproofness of the coating films from the composition will be poor and, in addition, the storage stability of the composition for coating will be poor. If, however, the amount is smaller than 0.001 parts by weight, there may occur another problem that the curability of the composition will be poor. The preferred range of the amount of the component (B) falls between 0.01 and 80 parts by weight, more preferably between 0.1 and 50 parts by weight.

The molar ratio of the epoxy group in the vinylic copolymer (A) to the carboxyl group in the component (B) is preferably such that the molar number of the epoxy group relative to one mol of the carboxyl group (epoxy group/ carboxyl group) is from 0.2 to 5.0, more preferably from 0.2 to 4.0, even more preferably from 0.5 to 3.0, in order that the curable composition could have good thermal curability and that the coating films from the composition could have good acid resistance, good weather resistance and good waterproofness.

For the component (B), carboxyl group-having oligomer compounds are preferred to carboxyl group-having resins from the viewpoint that the curable composition obtained could have better thermal curability and that the coating films from the composition could have better scratch resistance and better recoating adhesiveness.

Component (C)

The organic solvent for the component (C) for use in the invention may be selected from glycol monoalkyl ethers, vinyl ethers and cyclic ethers. One or more of these may be used either singly or as combined.

The glycol monoalkyl ethers include, for example, ethylene glycol monomethyl ether (methyl cellosolve), ethylene glycol monoethyl ether, ethylene glycol monopropyl ether, ethylene glycol monobutyl ether, ethylene glycol phenyl ether, ethylene glycol hexyl ether, ethylene glycol monomethoxy ether, propylene glycol monomethyl ether, propylene glycol monoethyl ether, propylene glycol monopropyl ether, diethylene glycol monomethyl ether, diethylene glycol monoethyl ether, etc.

The vinyl ethers include, for example, methyl vinyl ether, ethyl vinyl ether, propyl vinyl ether, butyl vinyl ether, 3,4-dihydro-2H-pyran, 3,4-dihydrofuran, 3,4-dihydro-2-methoxy-2H-pyran, etc.

The cyclic ethers include, for example, tetrahydrofuran, tetrahydropyran, diethylene oxide, etc.

The glycol monoalkyl ethers are preferred, since they smell little in the coating composition and since their ability to improve the storage stability of the composition is great.

The component (C) further comprises any of monoalkyl alcohol compounds and compounds capable of being hydrolyzed through reaction with water to give alcohols (dehydrating agents). One or both of these compounds may be used either singly or as combined.

The monoalkyl alcohol compounds include, for example, methanol, ethanol, n-propanol, isopropanol, n-butanol, isobutanol, t-butanol, etc.

The compounds capable of being hydrolyzed through reaction with water to give alcohols may be hydrolyzable ester compounds, including, for example, trimethyl orthoformate, triethyl orthoformate, trimethyl orthoacetate, triethyl orthoacetate, as well as tetraalkyl silicates such as tetramethyl silicate, tetraethyl silicate or the like, and even condensates of such tetraalkyl silicates and their analogues, etc. These may be used either singly or as combined.

The amount of the solvent and that of the dehydrating agent for the component (C) each may be from 1.0 to 50 parts by weight, preferably from 5.0 to 30 parts by weight, relative to 100 parts by weight of the total solid resin content of the composition.

If the amounts of those solvent and dehydrating agent each are smaller than 1.0 part by weight, the storage stability of the composition, to which the invention is directed, will be bad. However, if they are larger than 50 parts by weight each, the vaporizing rate of the solvent from the coated composition is difficult to control, thereby often resulting in that the final appearance of the coating films formed will be poor.

If the amount of the dehydrating agent to be in the curable composition is too large, the coating films from the composition will have defects such as pin holes, etc. Therefore, the amount of the dehydrating agent shall be not larger than 50 parts by weight, preferably not larger than 30 parts by weight, more preferably not larger than 20 parts by weight, relative to 100 parts by weight of the component (A).

The component (C) may be previously in the components (A) and (B) while they are produced. However, in view of the storage stability of the composition, it is desirable that the component (C) is added to the mixture of the components (A) and (B).

Component (D)

The curing catalyst for the component (D) for use in the invention is not specifically defined, so far as it is usable as a curing catalyst for hydrolyzable silyl group-having compounds, or usable in esterification of acids with epoxy compounds.

As specific examples of the component (D), for example, mentioned are organic tin compounds such as dibutyl tin dilaurate, dibutyl tin dimaleate, dioctyl tin dilaurate, dioctyl tin dimaleate, tin octylate, etc.; phosphoric acid or phosphates such as phosphoric acid, monomethyl phosphate, monoethyl phosphate, monobutyl phosphate, monooctyl phosphate, monodecyl phosphate, dimethyl phosphate, diethyl phosphate, dibutyl phosphate, dioctyl phosphate, didecyl phosphate, etc.; adducts of phosphoric acid and/or monophosphates to epoxy compounds, such as propylene oxide, butylene oxide, cyclohexene oxide, glycidyl methacrylate, glycidol, acrylglycidyl ether, γ-glycidoxypropyltrimethoxysilane, γ-glycidoxypropyltriethoxysilane, γ-glycidoxypropylmethyldimethoxysilane, Yuka Shell Epoxy's Cardula E, Yuka Shell Epoxy's Epikote 828, Epikote 1001, etc.; organic titanate compounds; organic aluminium compounds; organic zinc compounds; carboxylic acid compounds (organic carboxylic acid compounds) such as maleic acid, adipic acid, azelaic acid, sebacic acid, itaconic acid, citric acid, succinic acid, phthalic acid, trimellitic acid, pyromellitic acid, etc., and their anhydrides; sulfonic acid compounds (organic sulfonic acid compounds) such as dodecylbenzenesulfonic acid, paratoluenesulfonic acid, 1-naphthalenesulfonic acid, 2-naphthalenesulfonic acid, etc., and those sulfonic acid compounds as blocked with nitrogen-containing compounds (e.g., 1-amino-2-propanol, monoethanolamine, diethanolamine, 2-(methylamino)ethanol, 2-dimethylethanolamine, 2-amino-2-methyl-1-propanol, diisopropanolamine, 3-aminopropanol, 2-methylamino-2-methylpropanol, morpholine, oxazolidine, 4,4-dimethyloxazolidine, 3,4,4-trimethyloxazolidine, etc.) (these are reaction products of acids and amines) (for example, King Industries' NACURE 5225, NACURE 5543, NACURE 5925, etc.); amines such as hexylamine, di-2-ethylhexylamine, N, N-dimethyldodecylamine, dodecylamine, DABCO, DBU, morpholine, diisopropanolamine, etc.; reaction products of those amines with acidic phosphates; alkaline compounds such as sodium hydroxide, potassium hydroxide, etc.; quaternary ammonium salts such as benzyltriethylammonium chloride or bromide, tetrabutylammonium chloride or bromide, etc.; phosphonium salts, etc. One or more of these curing catalysts may be used either singly or as combined.

Of the curing catalysts noted above, preferred are sulfonic acid compounds as blocked with nitrogen-containing compounds, since the curability of the composition being baked and the storage stability of the composition at room temperature are well balanced. For those, the nitrogen-containing compound is preferably at least one of primary or secondary amine compounds having 1 or 2 hydroxyl groups in one molecule (e.g., 2-amino-2-methyl-1-propanol, diisopropanolamine, etc.), morpholine and oxazolidine. The preferred curing catalysts may be combined with any of organic tin compounds, phosphoric acid and phosphates such as those mentioned above.

The equivalent ratio of the sulfonic acid compound to the nitrogen-containing compound preferably is from 1/0.75 to 1/3.0, more preferably from 1/1.0 to 1/2.0. If the amount of the nitrogen-containing compound is smaller than 0.75 in terms of the equivalent ratio, the storage stability of the composition at room temperature will be poor, and the outward appearance of the coating films from the composition will be poor. If, however, it is larger than 3.0, the curability of the composition being baked will be poor, and the coating films from the composition will be greatly yellowed.

Component (E)

The hydroxyl group-having compound for the component (E) does not have a hydrolyzable silyl group. The compound is not always needed to be a vinylic copolymer. However, in view of the durability of the coating films from the composition, it is desirable that the compound for the component (E) is a hydroxyl group-having copolymer of vinylic monomers (this is hereinafter referred to as "acrylic polyol").

The acrylic polyol may be prepared, for example, by copolymerizing hydroxyl group-having vinyl monomers with any other copolymerizable vinylic monomers.

The comonomers of hydroxyl group-having vinyl monomers are not specifically defined, including, for example, 2-hydroxyethyl (meth)acrylate, 2-hydroxypropyl (meth) acrylate, 2-hydroxybutyl (meth)acrylate, 4-hydroxybutyl (meth)acrylate, 2-hydroxyethyl vinyl ether, N-methylol (meth)acrylamide, 4-hydroxystyrene-vinyltoluene, Toa Synthetic Chemical's Aronics 5700, 4-hydroxystyrene, Nippon Shokubai Kagaku's HE-10, HE-20, HP-1 and HP-20 (these are all hydroxyl-terminated acrylate oligomers), Nippon Oils & Fats' Blemmer PP series (polypropylene glycol methacrylates), Blemmer PE series (polyethylene glycol monomethacrylates), Blemmer PEP series (polyethylene glycol polypropylene glycol methacrylates), Blemmer AP-400 (polypropylene glycol monoacrylate), Blemmer AE-350 (polyethylene glycol monoacrylate), Blemmer NKH-5050 (polypropylene glycol polytrimethylene monoacrylate), and Blemmer GLM (glycerol monomethacrylate), as well as ε-caprolactone-modified, copolymerizable hydroxyalkylvinylic compounds as obtained through reaction of hydroxyl group-having vinylic compounds and ε-caprolactone, and Daicel Chemical Industry's HEAC-1 (this has a carbonate structure), etc.

These hydroxyl group-having vinylic monomers may be used either singly or as combined.

The other vinylic monomers copolymerizable with those hydroxyl group-having vinylic monomers are not specifically defined, and their examples include methyl (meth) acrylate, ethyl (meth)acrylate, butyl (meth)acrylate, isobutyl (meth)acrylate, tert-butyl (meth)acrylate, cyclohexyl (meth) acrylate, 3,3,5-trimethylcyclohexyl (meth)acrylate, 2-ethylhexyl (meth)acrylate, isobornyl (meth)acrylate, stearyl (meth)acrylate, benzyl (meth)acrylate, cyclohexyl (meth)acrylate, trifluoroethyl (meth)acrylate, pentafluoropropyl (meth)acrylate, as well as unsaturated polycarboxylates such as diesters or half-esters of unsaturated polycarboxylic acids (maleic acid, fumaric acid, itaconic acid, etc.) with linear or branched alcohols having from 1 to 20 carbon atoms; aromatic hydrocarbon-based vinyl compounds such as styrene, α-methylstyrene, chlorostyrene, sodium styrenesulfonate, etc.; vinyl esters and allyl compounds such as vinyl acetate, vinyl propionate, diallyl phthalate, etc.; nitrile group-having vinyl compounds such as (meth) acrylonitrile, etc.; epoxy group-having vinyl compounds such as glycidyl (meth)acrylate, etc.; basic nitrogen atom-containing vinyl compounds such as dimethylaminoethyl (meth)acrylate, dimethylaminoethyl (meth)acrylate, diethylaminoethyl (meth)acrylate, vinylpyridine, aminoethyl vinyl ether, etc.; amido group-having vinyl compounds such as (meth)acrylamide, itaconic acid diamide, α-ethyl(meth) acrylamide, crotonamide, maleic acid diamide, fumaric acid diamide, N-vinylpyrrolidone, N-butoxymethyl(meth) acrylamide, N,N-dimethylacrylamide, N-methylacrylamide, acryloylmorpholine, etc.

One or more of those vinylic monomers copolymerizable with hydroxyl group-having vinylic monomers may be used either singly or as combined.

The acrylic polyol may have segments comprising urethane bonding or siloxane bonding, in its main chain in an amount of smaller than 50%.

The acrylic polyol is preferably prepared in solution polymerization using a radical initiator. In the solution polymerization, optionally used is a chain transfer agent such as n-dodecylmercaptan by which the molecular weight of the polymer formed could be controlled.

As the polymerization solvent, usable is a non-reactive solvent, by which, however, the present invention is not restricted.

One or more acrylic polyols may be used either singly or as combined.

As specific examples of the hydroxyl group-having compound for the component (E), which is not a vinylic copolymer, for example, mentioned are organic polyols such as polycaprolactone-polyol, polyvalerolactone-polyol, polyhexamethylene carbonate-polyol, etc.

The acrylic polyol is preferably a non-aqueous dispersed polymer, in view of the breaking stress and elongation of the coating films from the composition and of the easiness in controlling the rheology of the composition.

The non-aqueous dispersed polymer is meant to indicate a polymer as stably dispersed in an organic medium, as so written in literature such as "Dispersion Polymerization in organic Media" by K. E. J. Barrett (John Wiley & Sons, London, 1975). The polymer is composed of (1) a core site and (2) an arm site, in which the both sites are bonded to each other via covalent bonding, for example, through reaction of the carboxylic acid group and the epoxy group therein.

The core site (1) is of a macromolecular polymer having a number-average molecular weight of from 15,000 to 300,000 and dispersed in an organic medium; while the arm site (2) is of a polymer which is soluble in an organic solvent by itself and which is a stabilizer to form a three-dimensional barrier. The arm site (2) forms a macromer chain to bond to the core site (1).

The core site (1) is of a copolymer of vinylic monomers. The monomers are not specifically defined, and their examples include acrylic acid, methacrylic acid, and their alkyl esters, hydroxyalkyl esters, allyl esters and glycidyl esters, as well as styrene, acrylonitrile, etc.

The arm site (2) bonding to the core site (1) accounts for from 10 to 90%, preferably from 20 to 50% of the dispersed polymer. If the amount of the arm site (2) is larger than 90% of the dispersed polymer, cured products with good durability are difficult to obtain. If, on the contrary, the amount is smaller than 10%, the viscosity of the dispersed polymer will be too high, or the dispersed polymer will have poor stability and will give precipitates.

The organic solvent-soluble polymer for the arm site may comprise from 5 to 30 parts by weight, preferably from 5 to 25 parts by weight of at least one, hydroxyl group-having vinylic monomer, and from 70 to 95 parts by weight, preferably from 75 to 95 parts by weight of at least one other vinylic monomer not having a hydroxyl group. If the amount of the hydroxyl group-having vinylic monomer is smaller than 5 parts by weight, the curability of the composition formed will be poor. If, on the contrary, the amount is larger than 30 parts by weight, the solubility of the polymer in organic solvents will be low, and stability of the dispersed polymer will be poor.

It is desirable that the component (E) is added to the composition when the component (A) in the composition is resin [3] or resin [4]. Where the hydroxyl group-having compound of the component (E) to be added to the composition is not a non-aqueous dispersed polymer, it is desirable that the amount of the component (E) to be added is so controlled that the number of the alcoholic hydroxyl group in the component (E) is less than 0.1 per one $R^1O$—Si group in the component (A) (resin [3], resin [4]).

Where the hydroxyl group-having compound of the component (E) to be added to the composition is a non-aqueous dispersed polymer, it is desirable that the amount of the component (E) to be added is so controlled that the number of the alcoholic hydroxyl group in the arm site in the component (E) is less than 0.2, more preferably less than 0.1, per one $R^1O$—Si group in the component (A) (resin [3], resin [4]).

In any case, if the alcoholic hydroxyl group in the component (E) added is too much, the acid resistance and the waterproofness of the coating films from the composition will be poor.

Where the component (E) is not a non-aqueous dispersed polymer, it is desirable that the number-average molecular weight of the compound of the component (E) falls between 1,000 and 25,000, more preferably between 1,000 and 15,000. If the number-average molecular weight of the compound is smaller than 1,000, the weather resistance and the waterproofness of the coating films from the composition will be poor. If, on the contrary, it is larger than 25,000, the compatibility of the constituent components will be poor.

Where the component (E) is a non-aqueous dispersed polymer, it is also desirable that the number-average molecular weight of the organic solvent-soluble polymer that constitutes the non-aqueous dispersed polymer is from 1,000 to 25,000, more preferably from 1,000 to 15,000. If the number-average molecular weight of the polymer is smaller than 1,000, the stability of the dispersed polymer will be poor. If, on the contrary, it is larger than 25,000, the polymer forming the arm site could hardly dissolve in organic solvents.

The amount of the component (E) in the composition may be from 0 to 80 parts by weight relative to 100 parts by weight of the total solid content of the components (A) and (B) therein. If the amount of the component (E) is larger than 80 parts by weight, the acid resistance and the waterproofness of the coating films from the composition will be poor. Preferably, the amount of the component (E) is from 0 to 60 parts by weight, more preferably from 0 to 50 parts by weight, even more preferably from 0.001 to 50 parts by weight.

Component (F)

The curable composition of the invention may further contain an amino resin as the component (F), in addition to the components (A) to (E) noted above, for the purpose of further improving the curability of the composition and improving the outward appearance of the coating films from the composition.

The amount of the amino resin for the component (F) may be up to 30 parts by weight, preferably up to 15 parts by weight, more preferably up to 5 parts by weight, relative to 100 parts by weight of the total solid resin content of the components (A), (B) and (E). If the amount of the amino resin (F) is larger than 30 parts by weight, the acid resistance of the coating films from the composition will be poor. In order to more effectively attain its effect, the amount of the component (F) to be added is desirably 1 part by weight or more.

As examples of the amino resin (F), mentioned are amino resins (methylolated amino resins such as melamine resins, urea resins, guanamine resins, etc.), which may be prepared through reaction of an amino component, such as melamine, urea, benzoguanamine, glycol urea, acetoguanamine, dicyandiamide or the like, and an aldehyde component such as formaldehyde, paraformaldehyde, acetaldehyde, benzaldehyde or the like.

Of those amino resins, preferred are melamine resins, since the final appearance of the coating films from the composition is good and since the curability of the composition is good.

The amino resins (e.g., methylolated amino resins) may be etherified with alcohols such as methyl alcohol, ethyl alcohol, n-propyl alcohol, iso-propyl alcohol, n-butyl alcohol, iso-butyl alcohol, 2-ethylbutanol, 2-ethylhexanol, etc.

Specific examples of the amino resin (F) include n-butylated melamine resins such as Mitsui Toatsu Chemical's Uban 20SE, Uban 20SE-60, Uban 128, Uban 220, Uban 225, Uban 20SB, Uban 20SE-60, Uban 21R, Uban 22R, Uban 122, Uban 28-60, Uban 20HS, Uban2028, Uban202, Uban 120, etc.; isobutylatedmelamine resins such as Uban 62, Uban 69-1, Uban 169, Uban 2061, etc.; butylated urea resins such as Uban 10S-60, Uban 10R, etc.; melamine resins such as Mitsui Cytec's Cymel 303, Cymel 232, Cymel 370, Cymel 325, Cymel 236, Cymel 738, Cymel 771, Cymel 327, Cymel 703, Cymel 701, Cymel 266, Cymel 267, Cymel 285, Cymel 235, Cymel 238, Cymel 1141, Cymel 272, Cymel 254, Cymel 202, Cymel 1156, Cymel 1158, Cymel 300, Cymel 301, Cymel 350, Cymel 736, etc. Of those, preferred are alkyl-etherified melamine resins such as Cymel 235, Cymel 238, Cymel 1158, etc., in view of the curability of the composition.

Others

For the curable composition of the invention, further usable are solvents, in which both the components (A) and (B) are soluble or stably dispersible. The solvents may be the same as those used in producing the vinylic copolymer (A). As typical examples of such solvents, mentioned are hydrocarbons such as toluene, xylene, cyclohexane, n-hexane, octane, etc.; alcohols such as methanol, ethanol, iso-propanol, n-butanol, iso-butanol, sec-butanol, t-butanol, etc.; esters such as methyl acetate, ethyl acetate, butyl acetate, etc.; ketones such as acetone, methyl ethyl ketone, methyl isobutyl ketone, cyclohexanone, etc.

The solvents used in polymerization to form the component (A) may be directly used as those for the components (A) and (B).

The amount of the solvent to be used is not specifically defined. However, if too much solvent is used, the coating films from the composition obtained will have defects, for example, the films will be foamed. Therefore, the amount of the solvent to be used is generally not larger than 70 parts by weight, preferably not larger than 50 parts by weight, more preferably not larger than 20 parts by weight, relative to 100 parts by weight of the component (A).

Weather resistance improvers such as UV absorbents, light stabilizers and the like may be added to the curable composition for top coating of the invention, to thereby further improve the weather resistance of the coating films from the composition. In particular, adding both UV absorbent and light stabilizer to the composition is preferred, as more effectively improving the weather resistance of the coating films.

The UV absorbent includes, for example, benzophenones, triazoles, phenylsalicylates, diphenylacrylates, acetophenones, etc. One or more of these may be used either singly or as combined.

The light stabilizer includes, for example, bis(2,2,6-tetramethyl-4-piperidyl) sebacate, bis(1,2,2,6,6-pentamethyl-4-piperidyl) sebacate, bis(1,2,2,6,6-pentamethyl-4-piperidyl) 2-(3,5-tert-butyl-4-hydroxybenzyl)-2-n-butylmalonate, tetrakis(2,2,6,6-tetramethyl-4-piperidyl) 1,2,3, 4-butane-tetracarboxylate, tetrakis(1,2,2,6,6-pentamethyl-4-piperidyl) 1,2,3,4-butane-tetracarboxylate, etc. One or more of these may be used either singly or as combined.

The amount of the UV absorbent is generally from 0.1 to 10 parts by weight, preferably from 1 to 5 parts by weight, relative to 100 parts by weight of the solid resin content of the curable composition; and that of the light stabilizer is generally from 0.1 to 10 parts by weight, preferably from 1 to 5 parts by weight, relative to 100 parts by weight of the solid resin content of the curable composition.

One embodiment of using the curable composition of the invention for coating will be mentioned below.

A substrate is first coated with a base coat paint containing metallic powder and/or color pigment, and then overcoated with a clear paint for top coat consisting essentially of a curable composition of the invention.

The base coat paint containing metallic powder and/or color pigment is not specifically defined. For example, it consists essentially of an aminoalkyd resin, an oil-free alkyd resin, a thermosetting acrylic resin, a thermosetting urethane resin, a nitrocellulose lacquer, a modified acrylic lacquer, a straight acrylic lacquer, a cold-setting urethane resin, an acrylic enamel resin, an oxidation-setting alkyd resin, an oxidation-setting, modified alkyd resin (e.g., CAB, etc.), a cold-setting or thermosetting fluorine resin, a hydrolyzable silyl group-having resin, a curable composition of the invention, or a mixture of those, and containing metallic powder and/or color pigment.

The base coat paint containing metallic powder and/or color pigment may be of any type, including, for example, a solution-type paint dissolved in an organic solvent, a non-aqueous dispersion-type paint, a multi-liquid-type paint, a powdery paint, a slurry paint, an aqueous paint, etc.

The metallic powder and the color pigment are not also specifically defined, and any conventional ones are employable. Specific examples of the metallic powder include, for example, aluminum powder, copper powder, mica powder, etc.; and those of the color pigment include, for example, organic pigments such as phthalocyanine blue, toluidine red, benzidine yellow, etc., and inorganic pigments such as titanium oxide, carbon black, red iron oxide, etc. One or more of those metallic powders and color pigments may be used either singly or as combined.

Adding UV absorbent and light stabilizer such as those mentioned hereinabove to the base coat is recommended, as further improving the weather resistance of the coated articles.

If desired, silicone compounds (aminosilane compounds, etc.) such as those mentioned above may be added to the base coat paint containing metallic powder and/or color pigment, by which the adhesiveness between the base coat and the overlying clear top coat may be improved.

In that case, the amount of the silicone compound to be added is generally not larger than 20 parts by weight, preferably from 0.5 parts by weight to 10 parts by weight, relative to 100 parts by weight of the base coat paint containing metallic powder and/or color pigment.

The coated articles of the invention have a clear top coat as painted over a base coat. For example, they may be produced in a 2-coat 1-bake method comprising coating a substrate with a base coat paint containing metallic powder and/or color pigment such as that mentioned above, setting it as such for a few minutes, then further coating it with a clear top coat paint in an wet-on-wet manner, and finally curing it under heat; or in a 2-coat 2-bake method comprising coating a substrate with a base coat paint containing metallic powder and/or color pigment, curing it under heat, then coating it with a clear top coat paint, and further curing it under heat. The coating with the clear top coat paint may be attained in any conventional manner of dipping, spraying, brushing, roll-coating or flow-coating. After having been thus coated, the coated paint layer may be cured under heat at a temperature of 30° C. or higher, preferably at a temperature falling between 55 and 350° C.

The thickness of the coating films varies, depending on the use of the coated articles, and therefore could not be indiscriminately defined. Preferably, however, the thickness of the base coat containing metallic powder and/or color pigment may fall between 10 and 30 μm in view of its masking property; while that of the clear top coat may fall between 20 and 50 μm in view of its durability.

The curable composition for top coating of the present invention had good thermal curability, and forms good coating films having good acid resistance, good scratch resistance and good outward appearance, and having good stain resistance. Therefore, the composition is favorable to top coating, for example, for cars, industrial machines, steel furniture, interior and exterior decorations for constructions, household electric appliances, plastic goods, etc. The composition is especially favorable for top coating for cars.

The curable composition for top coating of the invention and also articles coated with it will be described in more detail with reference to the following Examples, which, however, are not intended to restrict the scope of the invention.

PRODUCTION EXAMPLES (A-1 to A-6) for Component (A)

Production Example 1 (E-1) for Component (E)

The components of "Part 2" in Table 1 below were fed into a reactor equipped with a stirrer, a thermometer, a reflux condenser, a nitrogen gas duct and a dropping funnel, and heated up to 115° C. while introducing nitrogen gas thereinto, and then a mixed solution of "Part 1" was dropwise added thereto at a constant rate over a period of 4 hours.

Next, a mixed solution of "Part 3" was dropwise added to this at a constant rate over a period of 1 hour. Then, this was immediately stirred at 115° C. for 2 hours, and thereafter cooled to room temperature. Finally, a mixed solution of "Part 4" was added to this, and stirred.

The solid concentration of the resulting solution, the number-average molecular weight of the copolymer as measured through gel permeation chromatography (hereinafter referred to as GPC), the silicone equivalent, the alcoholic hydroxyl equivalent and the epoxy equivalent are shown in Table 1.

condenser, a nitrogen gas duct and a dropping funnel, and heated up to 115° C. while introducing nitrogen gas thereinto, and then a mixed solution of "Part 1" was dropwise added thereto at a constant rate over a period of 4 hours.

TABLE 1

|      |                              | Production Example for Component (A) |         |         |         |         |         | Production Example for Component (E) |
|------|------------------------------|---------|---------|---------|---------|---------|---------|---------|
|      |                              | Resin [1] | | Resin [2] | Resin [3] | | Resin [4] | |
| Part | Composition                  | A-1     | A-2     | A-3     | A-4     | A-5     | A-6     | E-1     |
| 1    | A-174                        | —       | —       | —       | 35      | 10      | 15      | —       |
|      | Styrene                      | 20      | 20      | 15      | 10      | 10      | 10      | 25      |
|      | Cyclohexyl Methacrylate      | 20      | 20      | 15      | 20      | 15      | 15      | 15      |
|      | 2-Ethylhexyl Methacrylate    | 35      | 20      | 20      | 25      | 27      | 17      | 36      |
|      | Glycidyl Methacrylate        | 25      | 40      | 42      | 10      | 38      | 30      | —       |
|      | 2-Hydroxyethyl Methacrylate  | —       | —       | 8       | —       | —       | 13      | 26      |
|      | Solvesso 100                 | 12      | 12      | 12      | 8.2     | 8.2     | 8.2     | 12.4    |
|      | 1-Butanol                    | 6       | 6       | 6       | 5.5     | 5.5     | 5.5     | —       |
|      | V-59                         | 4.75    | 5.7     | 5.7     | 4.75    | 5.7     | 5.7     | 5.7     |
| 2    | Solvesso 100                 | 15.5    | 15.5    | 15.5    | 15.6    | 15.6    | 15.6    | 15.5    |
|      | 1-Butanol                    | 10.5    | 10.5    | 10.5    | 10.4    | 10.4    | 10.4    | 10.5    |
| 3    | Xylene                       | 10      | 10      | 10      | 5       | 5       | 5       | 10      |
|      | V-59                         | 0.25    | 0.3     | 0.3     | 0.25    | 0.3     | 0.3     | 0.3     |
| 4    | Methyl Orthoacetate          | —       | —       | —       | 4       | 4       | 4       | —       |
|      | Methanol                     | —       | —       | —       | 2       | 2       | 2       | —       |
| Solid Concentration (%)              | 63      | 62      | 64      | 63      | 64      | 63      | 67      |
| Number-Average Molecular Weight      | 5100    | 4500    | 4700    | 5200    | 4700    | 4600    | 4600    |
| Hydrolyzable Silyl Equivalent        | —       | —       | —       | 709     | 2480    | 1653    | —       |
| Alcoholic Hydroxyl Equivalent        | —       | —       | 1625    | —       | —       | 1000    | 500     |
| Epoxy Equivalent                     | 568     | 355     | 338     | 1420    | 374     | 473     | —       |
| Alcoholic Hydroxyl Group/Hydrolyzable Silyl Group | —       | —       | —       | —       | —       | 1.65    | —       |

A-174: γ-trimethoxysilylpropyl methacrylate (manufactured by Nippon Unicar Co.)
V-59: 2,2'-azobis(2-methylbutyronitrile) (manufactured by Wako Pure Chemical Co.)

Production Examples 1 and 2 for Component (B) (carboxylic acid oligomers B-1 and B-2)

The components of "Part 1" in Table 2 below were fed into a reactor equipped with a stirrer, a thermometer, a reflux condenser, a nitrogen gas duct and a dropping funnel, and stirred at 120° C. for 15 minutes while introducing nitrogen gas thereinto, and thereafter the components of "Part 2" were added thereto over a period of 15 minutes.

Then, these were reacted at 120° C. for 3 hours. The IR absorption spectrum (hereinunder referred to as IR) of the reaction product was measured, in which the absence of the absorption by acid anhydride groups (at 1,785 cm$^{-1}$) was confirmed.

TABLE 2

|      |                                          | Production Example for Component (B) | |
|------|------------------------------------------|---------|---------|
| Part | Composition                              | B-1     | B-2     |
| 1    | Triethylamine                            | 0.07    | 0.07    |
|      | Pentaerythritol                          | 35      | —       |
|      | Trimethylolpropane                       | —       | 34      |
|      | Propylene Glycol Monomethyl Ether Acetate | 110     | 76      |
| 2    | Methylhexahydrophthalic Anhydride        | 169     | —       |
|      | Hexahydrophthalic Anhydride              | —       | 113     |
| Solid Concentration (%)                         | 65      | 66      |
| Molecular Weight                                | 809     | 597     |

Production Example 3 for Component (B) (B-3)

The components of "Part 2" in Table 3 below were fed into a reactor equipped with a stirrer, a thermometer, a reflux condenser, a nitrogen gas duct and a dropping funnel, and heated up to 115° C. while introducing nitrogen gas thereinto, and then a mixed solution of "Part 1" was dropwise added thereto at a constant rate over a period of 4 hours.

Next, a mixed solution of "Part 3" was dropwise added to this at a constant rate over a period of 1 hour. Then, these were immediately stirred at 115° C. for 2 hours, and then cooled to room temperature.

The solid concentration of the resulting solution, and the number-average molecular weight of the copolymer (as measured through GPC) are Table 3.

TABLE 3

|      |                              | Production Example for Component (B) B-3 |
|------|------------------------------|---------|
| Part | Composition                  |         |
| 1    | Acrylic Acid                 | 20      |
|      | Styrene                      | 20      |
|      | 2-Ethylhexyl Methacrylate    | 30      |
|      | Isobutyl Methacrylate        | 30      |
|      | Solvesso 100                 | 10      |
|      | 1-Butanol                    | 6       |
|      | V-59                         | 5.7     |
| 2    | Solvesso 100                 | 15      |
|      | 1-Butanol                    | 10      |
| 3    | Xylene                       | 10      |
|      | V-59                         | 0.3     |
| Solid Concentration (%)             | 63      |
| Number-Average Molecular Weight     | 4700    |

Production Example 4 for Component (B) (B-4)

In the same manner as in Production Example (B-3) except that the components indicated in Table 4 below were used, produced was a polymer (B'-4).

The solid concentration of the resulting solution, and the number-average molecular weight of the polymer (B'-4) (as measured through GPC) are shown in Table 4.

TABLE 4

| Part | Composition | Production Example for Component (B) B'-4 |
|---|---|---|
| 1 | Styrene | 15 |
|   | Cyclohexyl Methacrylate | 20 |
|   | 2-Ethylhexyl Acrylate | 30 |
|   | Isobutyl Methacrylate | 14.5 |
|   | Maleic Anhydride | 20.5 |
|   | Solvesso 100 | 20.5 |
|   | Propylene Glycol Monomethyl Ether Acetate | 4.1 |
|   | T-butyl Peroxy-2-ethylhexanoate | 5.7 |
| 2 | Solvesso 100 | 26 |
| 3 | Xylene | 10 |
|   | T-butyl Peroxy-2-ethylhexanoate | 0.3 |
| Solid Concentration (%) | | 52 |
| Number-Average Molecular Weight | | 6000 |

To 192.3 parts of the resulting polymer (B'-4), added were 1.0 part of triethylamine as dissolved in 17.6 parts of butyl acetate and 10 parts of methanol, and reacted at 60° C. for 8 hours. Thus was obtained a polymer (B-4). In its IR, confirmed was the complete absence of the absorption by acid anhydride groups (at 1,785 cm$^{-1}$).

Production Example 2 for Component (E) (E-2)

The components of "Part 1" in Table 5 below were fed into a reactor, and heated at the refluxing temperature (97° C.). Next, the component of "Part 2" was added thereto, and immediately the components of "Part 3" and "Part 4" were added thereto at a constant rate over a period of 225 minutes.

The mixture was transparent in the initial stage, but immediately after the addition of the "Part 3" and the "Part 4" thereto, it became pale blue, and then became milky in 40 minutes.

After this, the components of "Part 5" were added to the mixture at a constant rate over a period of 30 minutes, and then kept at the refluxing temperature for further 90 minutes.

Finally, the excess solvent was removed. Thus was obtained a stable dispersion with no phase separation, which had a solid content of 63.4% and was milky.

The resulting polymer had a Stormer viscosity of 76 KU and a mean particle size of 300 nm.

The "solution containing organic solvent-soluble polymer" in "Part 1" of the starting material was prepared by polymerizing the monomers shown in parenthesis in the solvent also shown in parenthesis. This polymer forms the arm site (2).

On the other hand, the polymer of methacrylic acid, 2-hydroxyethyl acrylate, methyl methacrylate, methyl acrylate, and glycidyl methacrylate in "Part 3" of the starting material forms the core site (1).

TABLE 5

| Part | Composition | Amount |
|---|---|---|
| Production Example 2 for Component (E) E-2 | | |
| 1 | Solution Containing Organic Solvent-Soluble Polymer (Mw = 3500) (solution of 62% acrylic polymer composed of 15% of styrene, 28% of butyl methacrylate, 30% of butyl acrylate, 10% of 2-hydroxyethyl acrylate, 2% of acrylic acid, and 15% of ethyl methacrylate, in which the solvent is a mixture of 82% of xylene and 18% of 1-butanol) | 579 g |
|   | Isopropanol | 22 g |
|   | Mineral Sprit | 41 g |
|   | Heptane | 460 g |
|   | Xylene | 95 g |
| 2 | T-butyl Peroctanoate | 1 g |
| 3 | Methacrylic Acid | 40 g |
|   | 2-Hydroxyethyl Acrylate | 250 g |
|   | Methyl Methacrylate | 365 g |
|   | Methyl Acrylate | 180 g |
|   | Styrene | 150 g |
|   | Glycidyl Methacrylate | 15 g |
|   | Solution Containing Organic Solvent-Soluble Polymer (same as in Part 1) | 290 g |
|   | Heptane | 26 g |
| 4 | Mineral Spirit | 148 g |
|   | 1-Butanol | 26 g |
|   | T-butyl Peroctanoate | 11 g |
| 5 | T-butyl Peroctanoate | 8 g |
|   | 1-Butanol | 59 g |
|   | Heptane | 6 g |

Examples 1 to 8, Comparative Examples 1 to 4

The component (A) [(A-1) to (A-6)], the component (B) [(B-1) to (B-4)] and the component (C) prepared in Production Examples mentioned above were formulated in different solid ratios as in Table 6 below.

To the resulting mixtures of Examples and Comparative Examples, added were 0.4%, relative to the total solid resin content of each mixture, of a leveling agent (Kusumoto Chemical's L-1984-50), 2% of an UV absorbent, Tinuvin 384, and 1% of a light stabilizer, Tinuvin 123 (both products of Ciba Geigy).

Next, each mixture was diluted with Solvesso 100 (petroleum-type aromatic solvent, a product of Exxon Chemical) to have a viscosity taking about 20 to about 25 seconds in a Ford cup. Thus were prepared various clear paint samples for top coating.

A soft steel sheet was degreased and phosphorylated, and then coated with an epoxyamide-based, cationic electrodeposition primer and an intermediate-coating surfacer in that order, the both being for car bodies. The thus-coated sheet was used as a test substrate herein. The substrate was further coated with a commercially-available acrylic melamine resin-based coating material (black base coat).

Next, the clear paint sample for top coating was applied on the thus-coated-substrate in a wet-on-wet coating manner, set as such for 20 minutes, and then baked at 140° C. for 30 minutes.

The dry thickness of the base coat was about 15 μm, and that of the clear top coat was about 50 μm.

The coating films thus formed herein were tested for [1] acid resistance, [2] scratch resistance, [3] storage stability of clear top coat paints, [4] recoating adhesiveness, [5] accelerated weather resistance, and [6] pencil hardness, according to the methods mentioned below. The test data obtained are shown in Table 6.

[1] Acid Resistance:

0.5 cc of an aqueous solution of 10% sulfuric acid was dripped onto each coated sample through a pipette, and then heated in a drier at 80° C. for 30 minutes. After thus dried, the sample was washed with water to remove the sulfuric acid solution, and the condition of the surface of the coating film on the sample was visually observed. Each sample was evaluated according to the following criteria:

Point 10: No change found.

Point 9: Slight change found.

Point 8: Circular marks found.

Point 7: Slightly discolored and swollen.

Point 5: Definitely discolored with definite decrease in surface gloss.

Point 1: Coating film dissolved.

[2] Scratch Resistance (surface gloss retentiveness):

Each coated sample (150×100 mm) was fixed horizontally, to which was applied an abrasive (mixture of 1.2% of JIS Type 8 loam, 1.2% of JIS Type 11 loam, 0.6% of kaolin, 1% of neutral detergent and 96% of water) in an amount of about 0.05 g/cm$^2$. In that condition, the surface of the sample was rubbed with a weight covered with kraft paper. The contact surface of the weight had a diameter of 5 cm, and the load thereof was 22 g/cm$^2$.

Before and after rubbed for 20 strokes, the surface gloss of the coating film of each sample was measured at an angle of 20°, using a gloss meter (manufactured by Murakami Color Technology Laboratory). The surface gloss retentiveness (%) of each sample after 20 strokes was obtained according to the following equation.

Surface Gloss Retentiveness (%)=(surface gloss before rubbed/ surface gloss after rubbed)×100

Samples having a higher degree of surface gloss retentiveness have better scratch resistance.

[3] Storage Stability:

Clear top coat paint samples as prepared to have a viscosity of 150 cps at 23° C. were stored at 50° C. for 10 days, and their viscosity (cps at 23° C.) was measured with a B-type viscometer. Based on the data obtained, the storage stability of each sample was evaluated.

[4] Recoating Adhesiveness:

Each coated sample was again coated with the same base coat and then with the same clear paint in a wet-on-wet coating manner, in the same manner as previously. After having been set as such for 20 minutes, the samples were baked at 120° C. for 30 minutes. The adhesiveness of the coating film on each sample was measured according to the cross-cut peeling test (2 mm×2 mm×25) in JIS K 5400.

[5] Accelerated Weather Resistance:

Each sample was evaluated for the accelerated weather resistance according to JIS K 5400, using a sunshine carbon arc lamp weather resistance tester (manufactured by Suga Shikenki KK).

The test condition was as follows: Each sample was exposed to the carbon arc lamp for 1,500 hours at a black panel temperature of 63±3° C. in repeated intermittent raining cycles. In one cycle of 120 minutes, raining continued for 18 minutes. After the test, each sample was visually observed, and evaluated according to the following criteria:

○: No change.

○Δ: Water marks found, or whitened.

Δ: Great water marks found with definite decrease in surface gloss.

[6] Pencil Hardness:

The pencil hardness of each sample was measured according to JIS K 5400.

TABLE 6

| | | Example | | | | | | | | Comparative Example | | | |
|---|---|---|---|---|---|---|---|---|---|---|---|---|---|
| | | 1 | 2 | 3 | 4 | 5 | 6 | 7 | 8 | 1 | 2 | 3 | 4 |
| (A) | A-1 | — | — | — | — | 70 | — | — | — | — | — | — | — |
| | A-2 | — | — | — | — | — | — | — | 50 | 50 | — | — | — |
| | A-3 | — | — | — | — | — | 55 | — | — | — | 70 | — | — |
| | A-4 | 90 | 65 | — | — | — | — | — | — | — | — | 70 | — |
| | A-5 | — | — | 70 | — | — | — | 70 | — | — | — | — | — |
| | A-6 | — | — | — | 70 | — | — | — | — | — | — | — | 70 |
| (B) | B-1 | 10 | — | 30 | 30 | 20 | — | — | — | — | — | — | 30 |
| | B-2 | — | 10 | — | — | — | 25 | — | — | — | 30 | — | — |
| | B-3 | — | — | — | — | — | — | 20 | — | — | — | 20 | — |
| | B-4 | — | — | — | — | — | — | — | 50 | 50 | — | — | — |
| (C) | Propylene Glycol Monomethyl Ether | — | — | — | 5 | — | 5 | — | 5 | — | — | — | — |
| | Methyl Cellosolve | 5 | 10 | — | — | — | — | 5 | — | — | — | — | — |
| | 3,4-Dihydro-2H-pyran | — | — | 5 | — | — | — | — | — | — | — | — | — |
| | Tetrahydrofuran | — | — | — | — | 10 | — | — | — | — | — | — | — |
| | Methanol | 5 | — | 5 | 5 | — | — | 5 | — | — | — | — | — |
| | Isopropanol | — | — | — | — | — | 5 | — | 10 | — | — | — | — |
| | Trimethyl Orthoacetate | — | 5 | 5 | 5 | 5 | — | — | — | — | — | — | — |
| (D) | Tetraammonium Bromide | — | — | — | 0.2 | — | — | 0.2 | 0.2 | 0.2 | — | 0.2 | — |
| | Nacure 5225 | 1.0 | 1.0 | — | 1.0 | — | — | 1.0 | — | — | — | 1.0 | — |
| (E) | E-1 | — | 20 | — | — | — | — | — | — | — | — | — | — |
| | E-2 | — | — | — | — | 10 | 20 | 10 | — | — | — | 10 | — |
| (F) | Cymel 235 | — | 5 | — | — | — | 5 | — | — | — | — | — | — |
| ① Acid Resistance | | 10 | 10 | 10 | 10 | 9 | 9 | 10 | 9 | 9 | 10 | 10 | 10 |
| ② Scratch Resistance (surface gloss retentiveness (%)) | | 89 | 89 | 84 | 86 | 69 | 72 | 88 | 64 | 62 | 76 | 85 | 86 |

TABLE 6-continued

| | Example | | | | | | | | Comparative Example | | | |
|---|---|---|---|---|---|---|---|---|---|---|---|---|
| | 1 | 2 | 3 | 4 | 5 | 6 | 7 | 8 | 1 | 2 | 3 | 4 |
| ③ Storage Stability (cps) | 182 | 163 | 271 | 312 | 290 | 340 | 224 | 280 | >10000 | >10000 | >10000 | >10000 |
| ④ Recoating Adhesiveness | 10 | 10 | 10 | 10 | 10 | 10 | 6 | 5 | 5 | 10 | 5 | 10 |
| ⑤ Accelerated Weather Resistance | ○ | ○ | ○ | ○ | ○ | ○ | ○ | Δ ○ | Δ ○ | ○ | ○ | ○ |
| ⑥ Pencil Hardness | H | F | H | H | HB | HB | HB | HB | HB | F | HB | H |
| Molar Ratio (epoxy group/carboxyl group) | 1.29 | 0.92 | 1.27 | 1.00 | 1.25 | 1.31 | 1.18 | 1.35 | — | — | — | — |

Nacure 5225: Solution of 25 wt. % blocked sulfonic acid (dodecylbenzenesulfonic acid blocked with dimethyloxazolidine), manufactured by King Industries.
Cymel 235: Amino resin, manufactured by Mitsui Cytec Co.

From the data in Table 6, it is known that the coating films of the paints obtained in Examples 1 to 8 all had extremely excellent acid resistance, scratch resistance and weather resistance, and that the paint compositions of these Examples all had good storage stability.

INDUSTRIAL APPLICABILITY

The curable composition for top coating of the present invention has good storage stability and thermal curability, and the coating films from the composition have well-balanced physical properties in that their acid resistance, scratch resistance and appearance, as well as their weather resistance and stain resistance are all good. Therefore, the composition is favorable to top coating, for example, for cars, industrial machines, steel furniture, interior and exterior decorations for constructions, household electric appliances, plastics, etc.

What is claimed is:

1. A curable composition for coating, which comprises;
   (A) 100 parts by weight of a resin having at least 2 epoxy groups in one molecule and having an epoxy equivalent of from 200 to 2,000 g/mol, the resin of the component (A) having alcoholic hydroxyl groups in a ratio of not smaller than 400 g/mol in terms of the hydroxyl equivalent, and having hydrolyzable silyl groups in a ratio of not smaller than 500 g/mol in terms of the hydrolyzable silyl equivalent, and
   (B) from 0.001 to 100 parts by weight of a compound having at least 2 carboxyl groups in one molecule and a molecular weight of not greater than 2.000,
   in a molar ratio of the epoxy group to the carboxyl group of from 0.2/1 to 5.0/1, and contains;
   (C) at least one organic solvent selected from glycol monoalkyl ethers, vinyl ethers and cyclic ethers, and at least one selected from monoalkyl alcohol compounds and compounds capable of giving alcohols through hydrolysis, each in an amount of from 1.0 to 30 parts by weight relative to 100 parts by weight of the total solid resin content of the composition.

2. The curable composition for coating as claimed in claim 1, wherein;
   the compound of the component (B) is an oligomer compound as obtained through half-esterification of a polyol compound with an acid anhydride.

3. The curable composition for coating as claimed in claim 1 or 2, which contains;
   (D) a curing catalyst in an amount of from 0.001 to 10 parts by weight relative to 100 parts by weight of the total solid content of the components (A) and (B).

4. The curable composition for coating as claimed in claim 1 or 2, which contains;
   (E) a hydroxyl group-containing resin in an amount of from 0 to 80 parts by weight relative to 100 parts by weight of the total solid content of the components (A) and (B).

5. The curable composition for coating as claimed in claim 4, wherein the hydroxyl group-having resin of the component (E) is composed of from 5 to 30 parts by weight of at least one, hydroxyl group-having vinylic monomer and from 70 to 95 parts by weight of at least one vinylic monomer having no hydroxyl group, and this is a non-aqueous dispersed polymer to be prepared through dispersion polymerization of at least one, hydroxyl group-having vinylic monomer and at least one vinylic monomer having no hydroxyl group in an organic solution that contains an organic solvent-soluble polymer having a number-average molecular weight of from 1,000 to 25,000, and the non-aqueous dispersed polymer thus prepared is insoluble in said organic solution.

6. The curable composition for coating as claimed in claim 1 or 2, which contains;
   (F) an amino resin in an amount of not larger than 30 parts by weight relative to 100 parts by weight of the total solid content of the components (A) and (B).

7. A coated article having a clear top coat as formed over the surface of the substrate previously coated with a coating composition that contains metallic powder and/or color pigment, wherein;
   the clear top coat consists essentially of the curable composition for top coating of claim 1 or 2.

8. The curable composition for coating as claimed in claim 1 or 2, wherein the component (C) contains at least one organic solvent selected from glycol monoalkyl ethers, vinyl ethers and cyclic ethers, a monoalkyl alcohol compound and a compound capable of giving an alcohol through hydrolysis.

* * * * *